(12) United States Patent
Weldy

(10) Patent No.: US 7,258,387 B2
(45) Date of Patent: Aug. 21, 2007

(54) CLAMP FOR A TONNEAU COVER

(76) Inventor: Ross Weldy, 2505 Waterbend Dr., Elkhart, IN (US) 46514

( * ) Notice: Subject to any disclaimer, the term of this patent is extended or adjusted under 35 U.S.C. 154(b) by 0 days.

(21) Appl. No.: 11/524,522

(22) Filed: Sep. 20, 2006

(65) Prior Publication Data
US 2007/0063529 A1 Mar. 22, 2007

Related U.S. Application Data

(63) Continuation-in-part of application No. 10/286,711, filed on Nov. 4, 2002.

(51) Int. Cl.
*B60P 7/02* (2006.01)
(52) U.S. Cl. ............... 296/100.07; 296/100.04; 296/100.07
(58) Field of Classification Search ......... 296/100.04, 296/100.07, 100.16, 100.1, 100.02, 100.03, 296/100.08, 100.05, 100.06, 100.09
See application file for complete search history.

(56) References Cited

U.S. PATENT DOCUMENTS

| 4,861,092 A | | 8/1989 | Bogard |
| 5,595,417 A | | 1/1997 | Thoman et al. |
| 5,636,893 A | * | 6/1997 | Wheatley et al. ...... 296/100.07 |
| 6,076,881 A | * | 6/2000 | Tucker ................. 296/100.07 |

* cited by examiner

*Primary Examiner*—Joseph D. Pape
(74) *Attorney, Agent, or Firm*—Botkin & Hall, LLP

(57) ABSTRACT

A clamp for securing a tonneau cover to the bed of pick-up truck in which the clamp includes a base secured to the cover and a handle rotatably connected to the base. A cam part is located between the handle and the base, which upon rotation of the handle in a general horizontal plane causes the cam part to shift upwardly toward the base into engagement with the truck bed, securing the cover to the truck bed.

6 Claims, 4 Drawing Sheets

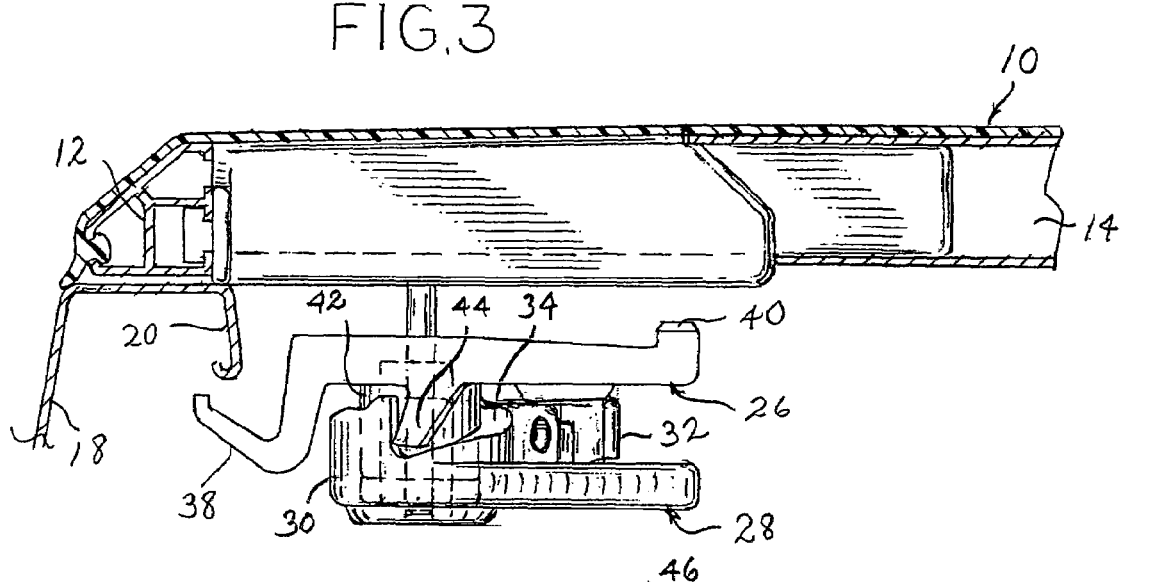
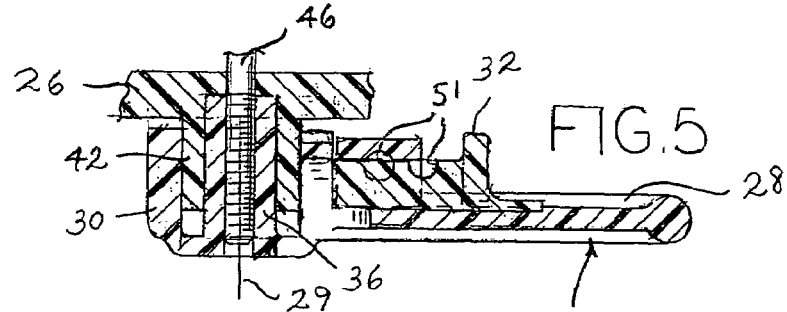
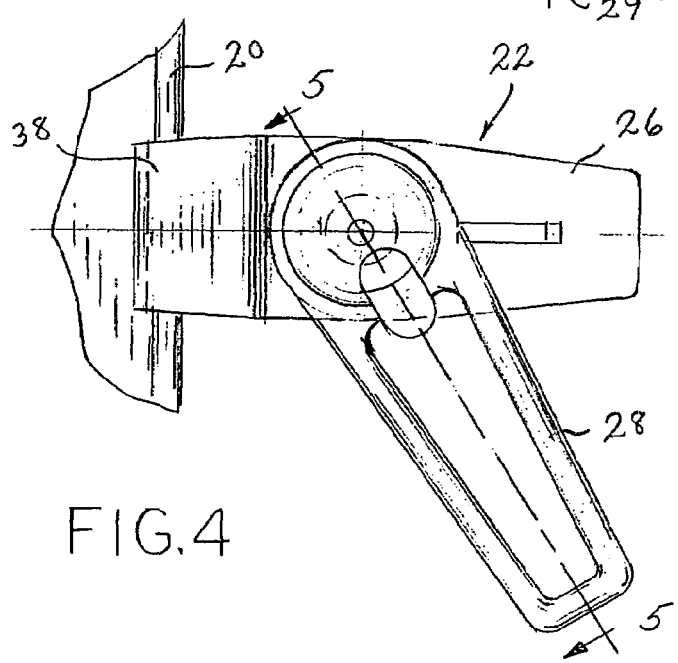

CLAMP FOR A TONNEAU COVER

CROSS-REFERENCE TO RELATED APPLICATION

This is a continuation in part of application Ser. No. 10/286,711 filed Nov. 4, 2002.

BACKGROUND OF THE INVENTION

This invention relates to a clamp which is manually actuated and which has specific but not limited use with what are called tonneau covers for beds of trucks.

Heretofore, hand actuated clamps for tonneau covers such as shown in co-invented application Ser. No. 10/286,711 filed Nov. 4, 2002, and incorporated herein by reference, were actuated by vertical movement of the clamp handle which caused a caming action which resulted in the clamp lip grasping the downturned marginal lip of a pick-up truck bed to which the tonneau cover was applied. This type of clamp performed satisfactorily as long as there was sufficient spacing below the tonneau cover to allow the up-and-down or vertical movement of the handle of the clamp. If hardware or receptacles were positioned along the sidewall of the truck bed, on many occasions there would not be sufficient room for up-and-down actuation of the clamp handle.

As such, in this invention the clamp handle is horizontally shiftable to impart a camming action, which causes the lip of the clamp to grasp the downturned lip at the margin of the truck bed sidewall. This movement of the clamp handle in a generally horizontal plane allows the area beneath the tonneau cover and clamp to be used for various storage devices without interference from the clamp.

Accordingly, it is an object of this invention to provide a clamp which secures two parts together upon a vehicle in which the actuating handle of the clamp moves or shifts in a generally horizontal plane.

Another object of this invention is to provide a clamp for a tonneau cover which is of economical construction and simple operation.

Other objects of this invention will become apparent upon a reading of the following description.

BRIEF DESCRIPTION OF THE DRAWINGS

A preferred embodiment of this invention has been chosen wherein:

FIG. 3 is a side view in partial section showing the clamp in its full open position as seen in FIG. 1;

FIG. 4 is a bottom view of the clamp as shown in FIG. 3;

FIG. 5 is a sectional view as seen along 5-5 of FIG. 4;

DESCRIPTION OF THE PREFERRED EMBODIMENT

Figure 1:
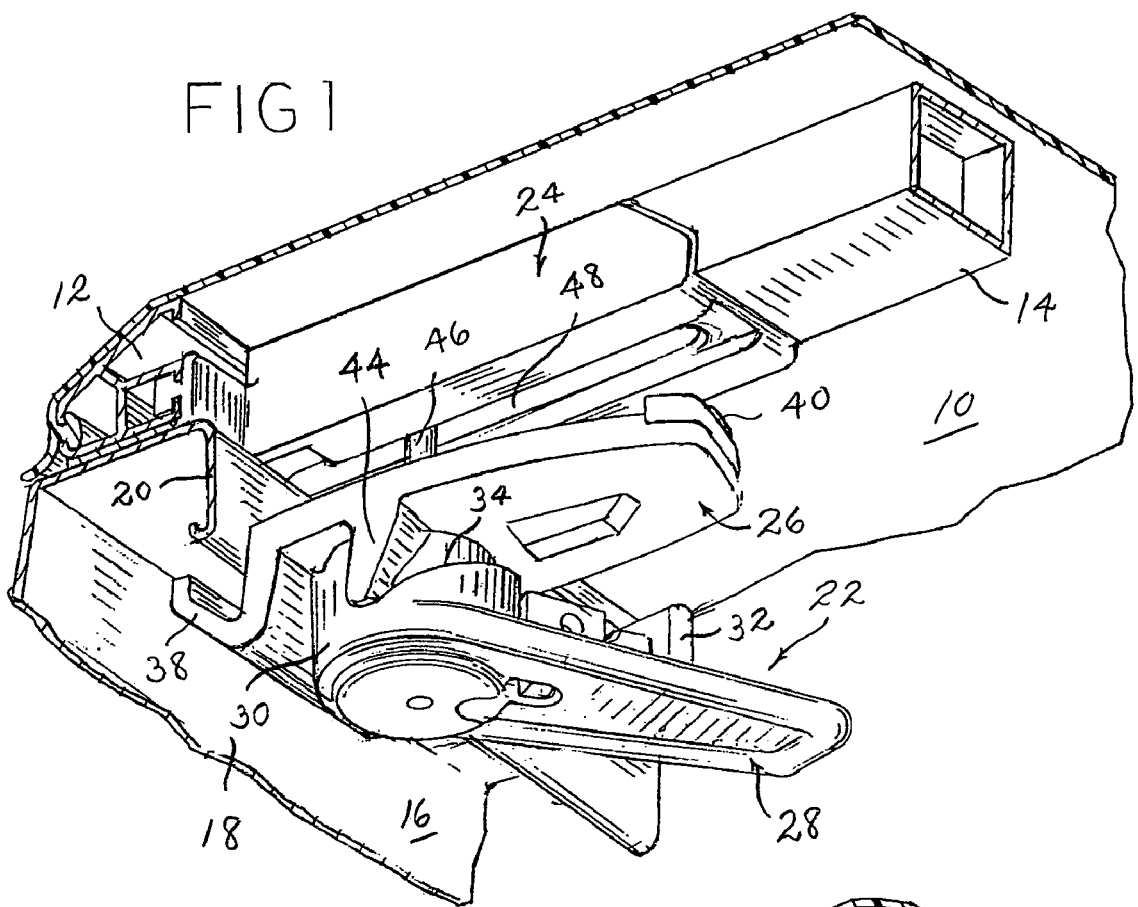
FIG. 1 is a perspective view of the clamp shown connected below the tonneau cover just prior to actuation of the clamp handle for grasping the downturn lip of the truck bed sidewall.

In FIG. 1, tonneau cover (10) is shown. Cover (10) includes longitudinal outside frame members (12) and transverse frame members (14) which extend between the longitudinal frame members. As is typical, cover (10) extends the length and width of the truck bed (16) having opposite sidewalls (18) which at the upper edge form a rail having a downturn lip (20).

Clamp (22) of this invention used to secure the tonneau cover to the truck bed includes a base (24), a handle (28), and a cam-lock part (26). Handle (28) includes a cylindrical cam part (30) at one end of the handle, and a lock (32) which is carried by the handle adjacent cam part (30). Cam part (30) includes a camming surface (34) and a concentric post (36) which extends upwardly and coaxially within cam part (30).

Cam lock part (26) is elongated, spacedly parallels base (24), includes at one end an upturned lip (38), and at its opposite end an upwardly extending protrusion (40). In the near center of cam lock part (26) and extending downwardly is a cylindrical boss (42), best seen in FIG. 5, which fits coaxially over post (36) of handle (28), fitting snugly between the post and cam part (30) of the handle. In this manner handle (28) is rotatable about boss (42). Cam lock part (26) includes a depending follower (44) which is outwardly radially spaced from boss (42) of the cam lock part. Follower (44) rides upon cam surface (34) of cam part (30) so that as handle (28) is rotated about axis (29) relative to the cam lock part, the follower rides over the cam surface causing the cam lock part to shift upwardly and downwardly under the influence of cam surface (34). The assembled cam lock part (26) and handle (28) are connected to base (24) by a bolt (46) which nests within a washer (47) and extends through a longitudinal slot (48) in base (24) with its threaded shank (50) being threaded into post (36) of the handle. Rotation of bolt (46) within boss (42) causes lip (38) of the cam lock part to shift toward and away from base (24).

Figure 6:
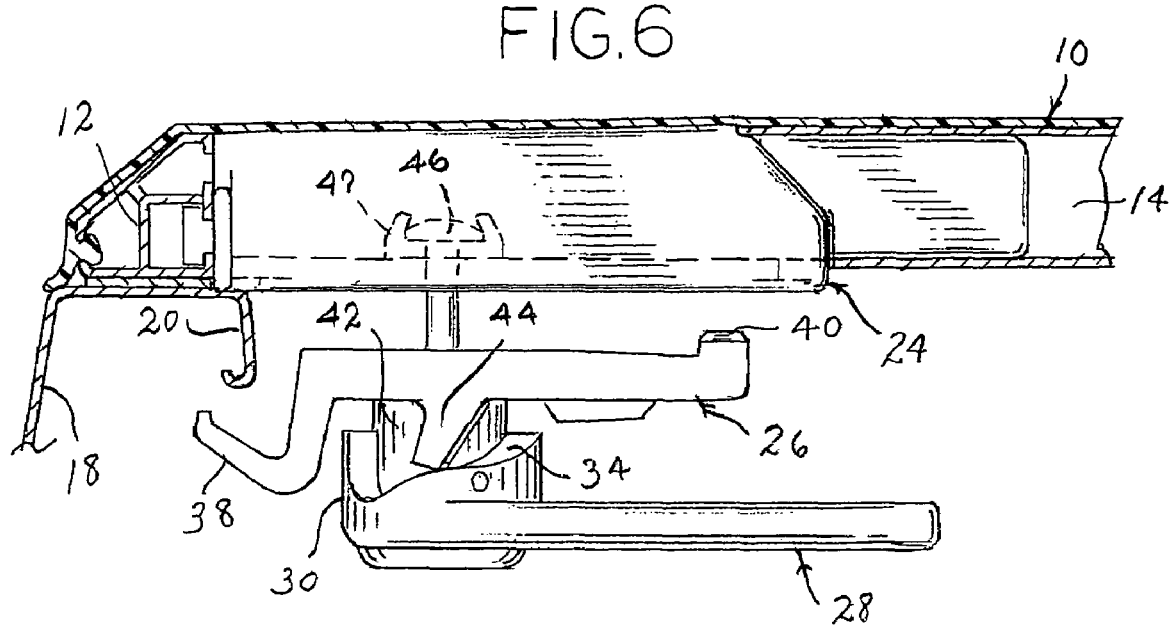
FIG. 6 is a partial sectional view showing the clamp from the side with the handle in its partially closed position.
Figure 7:
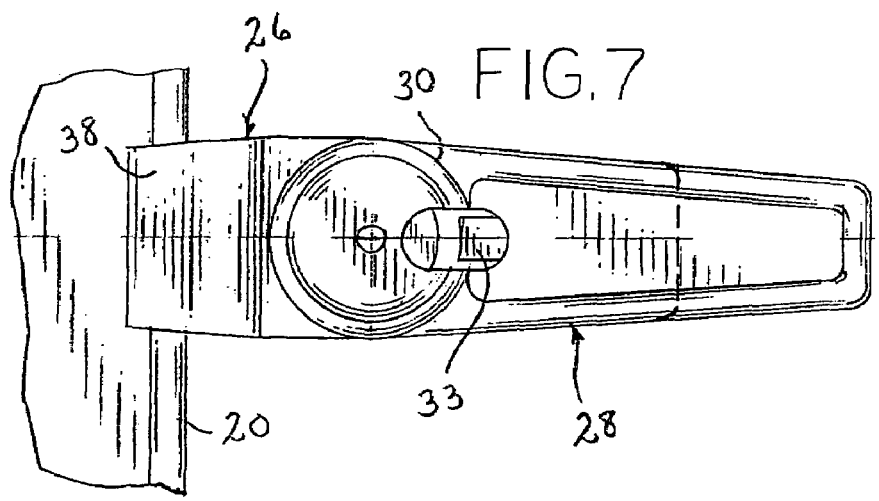
FIG. 7 is a bottom view of the clamp of FIG. 6.

Clamp (22) is secured to tonneau cover (10) by having base (24) fitted into an open end of tubular support cross member (14) so as to position the base adjacent to longitudinal frame member (12) of the cover. When in this position, cam lock part (26) and interconnected handle (28) in its open position are slid toward lip (20) of the truck bed with bolt (46) shifting longitudinally along slot (48) in the base. Bolt (46) is turned into post (36) of the handle so as to draw the cam lock part (26) and handle (28) upwardly with lip (38) being located under and in spaced but close proximity to lip (20) of the truck bed. This orientation is shown in FIG. 3 in which the handle is in its full open position so that cam follower (44) is located at its lower most position upon cam surface (34) of the handle. Handle (28) is then rotated as illustrated by the broken-line arrow in FIG. 2 in a general horizontal plane from the position shown in FIG. 1 to the position shown in FIG. 2 through the intermediate position shown in FIG. 6 in which cam follower (44) and its cam lock part (26) are urged upwardly until lip (38) snugly and in clamping fashion engages lip (20), such as shown in FIG. 2.

Figure 8:
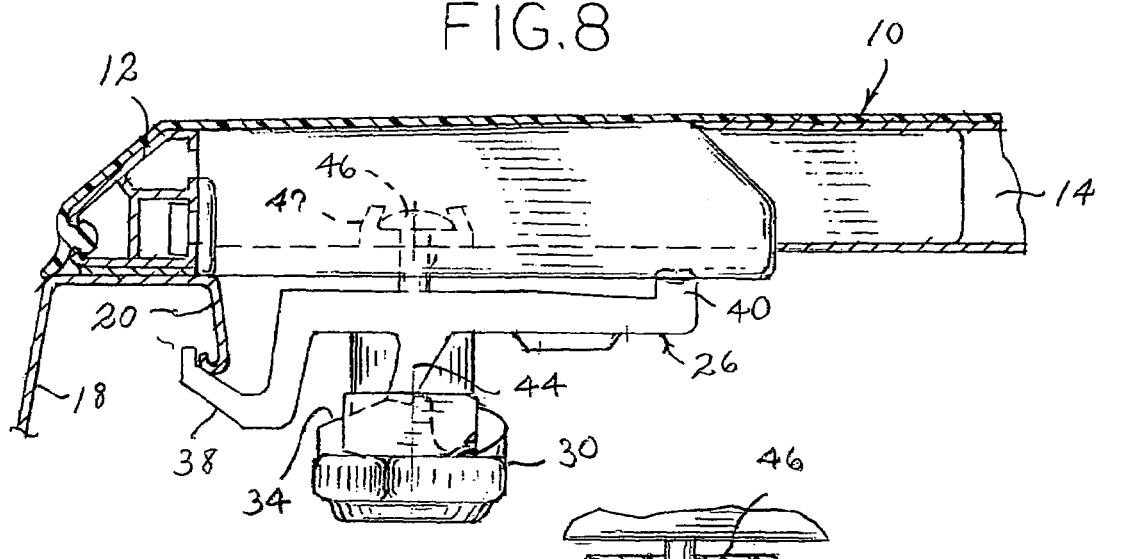
FIG. 8 is a side view of the clamp showing the tonneau cover and truck bed sidewall in partial section with the clamp in its full closed and secured position.
Figure 10:
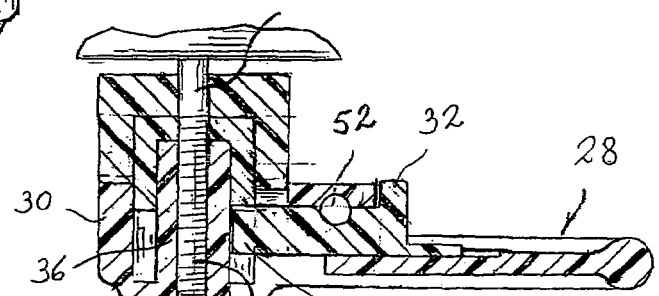
FIG. 10 is a sectional view of the clamp taken as seen from line 10-10 of FIG. 9.
Figure 9:
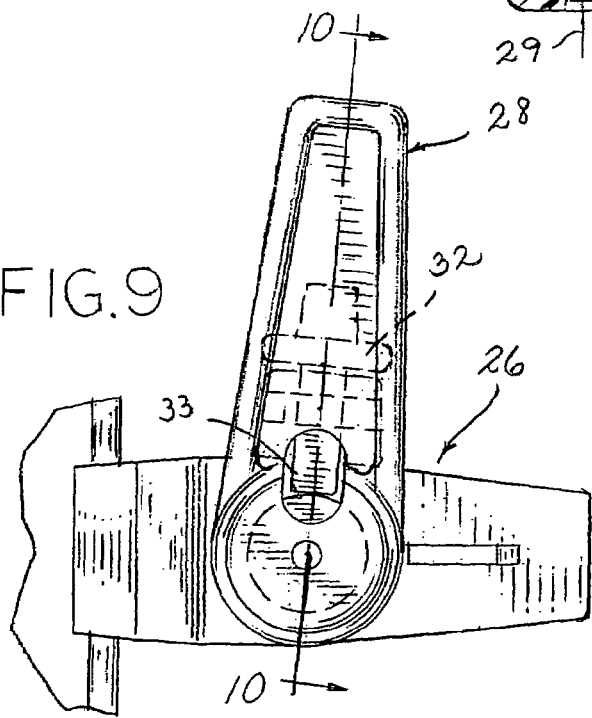
FIG. 9 is a bottom view of the clamp of FIG. 8.

As upturned lip (38) engages downturned lip (20) of the truck bed, protrusion (40) at the opposite end of the cam lock part (26) fits within slot (48) of the base so as to prevent rotation and rocking of the cam lock part relative to the base. When the handle (28) is in its fully closed position, cam follower (44) fits within a detent in cam surface (34), as illustrated in FIG. 8, to arrest the movement of the handle. With the handle in its closed position slide lock (32) carried by the handle is slid toward bolt (46) with the forward end (33) of the lock entering an opening in boss (42) of cam lock part (26) so as to secure the handle in its closed position as illustrated in FIGS. 9 and 10. A slight rise is preferably formed in handle (28) just below the slide lock so as to create a slight resistance to the movement of the lock, thus preventing unassisted free sliding movement of the lock. When lock (32) is in its closed position, as shown in FIG. 10, semi-circular cavities (51) in each of the lock part and the handle align to form a bore (52) through which a pin or lock may be place so as to prevent lock (32) from shifting into its unlocked position.

Figure 2:
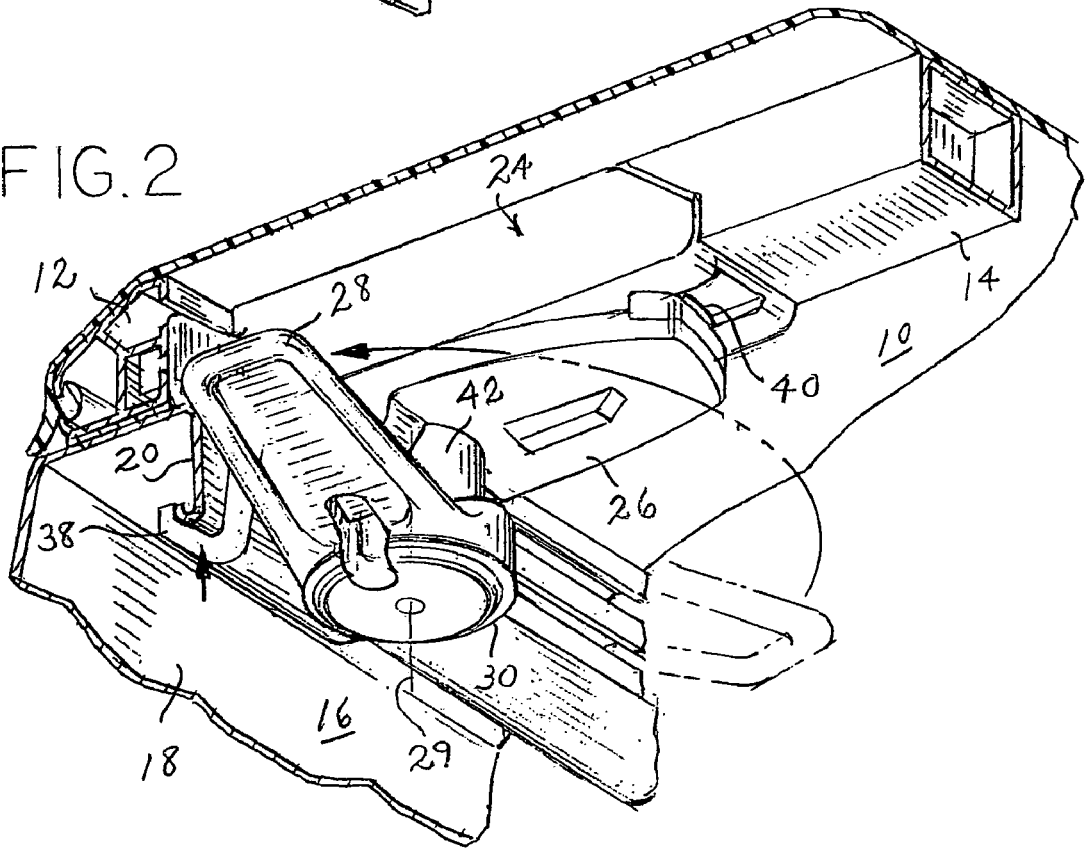
FIG. 2 is a perspective view like FIG. 1 but in which the handle of the clamp has been swung in a generally horizontal plane as indicated by the broken-line arrow causing the lip of the clamp to engage and grasp the downturn lip of the sidewall of the truck bed to secure the tonneau cover to the bed.

To release clamp (22), handle (28) is rotated from its closed position in FIG. 2 into its open position of FIG. 1, which allows cam lock part (26) to shift downwardly relative to the handle causing lip (38) to release from downturned lip (20) of the truck bed. When in this position, the connected cam lock part (26) and handle (28) are now free to shift along with bolt (46) in channel (48) laterally away from lip (20), thus allowing tonneau cover (10) to be removed or lifted from the truck bed.

Clamp (10) may be made from either a metal composition or a plastic composition.

The invention is not to be limited to the details above given but may be modified within the following appended claims.

What is claimed is:

1. A clamp for securing a tonneau cover to the rail of a truck bed sidewall, said clamp comprising a base adapted for securement to said cover adjacent said truck bed sidewall, a handle connected at one end by an elongated fastener to said base, a cam part located between said base and said handle, said handle including a beveled cam surface, said cam part including a follower in contact with said cam surface, wherein said cam part shifts toward and away from said base as said follower is moved along said cam surface when said handle is rotated about the longitudinal axis of said fastener between open and closed positions, said cam part including an engagement part for making clamping contact with said truck bed sidewall when said handle is in its closed position.

2. The clamp of claim 1 and a lock carried by said handle for engagement with said cam part to secure the handle in its closed position.

3. The clamp of claim 1 wherein said cam surface is located at one end of said handle, said cam part being shiftable along said fastener axis as said handle is moved between its open and closed positions.

4. The clamp of claim 3 wherein said handle includes a post, said cam part including a boss into which said post is rotatably fitted, said fastener including a shank extending freely through the cam part and having a threaded end turned into said post.

5. The clamp of claim 3 wherein said cam part includes a protrusion, said fastener extending freely through the cam part between said engagement part and said protrusion, said protrusion interlocking with said base when said handle is in its closed position.

6. The clamp of claim 1 wherein said cover includes a tubular transverse support, said base adapted to fit into one end of said support.

* * * * *